US012645189B2

(12) United States Patent (10) Patent No.: US 12,645,189 B2
Yoshioka et al. (45) Date of Patent: Jun. 2, 2026

(54) CONTROL APPARATUS, CONTROL METHOD, AND NON-TRANSITORY COMPUTER READABLE MEDIUM

(71) Applicant: Yokogawa Electric Corporation, Tokyo (JP)

(72) Inventors: Seiichirou Yoshioka, Tokyo (JP); Go Takami, Tokyo (JP); Keiichiro Kobuchi, Tokyo (JP); Yoshiyuki Jinguu, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 428 days.

(21) Appl. No.: 18/302,790

(22) Filed: Apr. 19, 2023

(65) Prior Publication Data

US 2023/0341828 A1 Oct. 26, 2023

(30) Foreign Application Priority Data

Apr. 26, 2022 (JP) ................................. 2022-072211

(51) Int. Cl.
*G05B 13/04* (2006.01)
*G05B 13/02* (2006.01)
(52) U.S. Cl.
CPC ......... *G05B 13/041* (2013.01); *G05B 13/027* (2013.01)
(58) Field of Classification Search
CPC ................ G05B 13/041; G05B 13/027; G05B 19/41885; G05B 2219/33056; G05B 13/0265; G06N 20/00
See application file for complete search history.

(56) References Cited

U.S. PATENT DOCUMENTS

2017/0227950 A1 8/2017 Kinoshita
2018/0032863 A1 2/2018 Graepel
(Continued)

FOREIGN PATENT DOCUMENTS

JP 2019020885 A 2/2019
JP 2020027556 A 2/2020
(Continued)

OTHER PUBLICATIONS

Office Action issued for counterpart Japanese Application No. 2022-072211, transmitted from the Japanese Patent Office on Jan. 14, 2025 (drafted on Jan. 6, 2025).
(Continued)

*Primary Examiner* — Christopher W Carter

(57) ABSTRACT

There is provided a control apparatus including: a model output acquisition unit configured to acquire an operation model output which is output according to inputting state data indicating a state of a facility, to an operation model trained by machine learning to output an action in accordance with the state of the facility by using simulation data from a simulator that simulates an operation in the facility; an index acquisition unit configured to acquire an index which is calculated by using real data from the facility and which is for monitoring a difference between a behavior of the simulator and an actual operation in the facility; a correction unit configured to correct the operation model output based on the index; and a control unit configured to output a manipulated variable for controlling a control target provided in the facility, according to the corrected operation model output.

20 Claims, 10 Drawing Sheets

(56) References Cited

U.S. PATENT DOCUMENTS

| | | | | |
|---|---|---|---|---|
| 2018/0173207 A1* | 6/2018 | Morimoto | ........ | G05B 19/41875 |
| 2019/0018374 A1 | 1/2019 | Hiroaki | | |
| 2019/0171194 A1* | 6/2019 | Sato | ................... | G05B 23/0294 |
| 2019/0265686 A1* | 8/2019 | Obata | ................ | G05B 19/4188 |
| 2020/0057416 A1 | 2/2020 | Matsubara | | |
| 2021/0157280 A1 | 5/2021 | Takami | | |
| 2021/0379552 A1* | 12/2021 | Shimoni | ................... | C02F 3/00 |
| 2023/0359155 A1* | 11/2023 | Schockaert | ............... | C21B 7/24 |

FOREIGN PATENT DOCUMENTS

| | | | |
|---|---|---|---|
| JP | 2021082367 A | 5/2021 | |
| JP | 2021086283 A | 6/2021 | |
| JP | 2021117699 A | 8/2021 | |
| WO | 2022069498 A1 | 4/2022 | |

OTHER PUBLICATIONS

Extended European Search Report for counterpart European Application No. 23169706.1, issued by the European Patent Office on Sep. 25, 2023.
Qi Chunyang et al, "Self-supervised reinforcement learning-based energy management for a hybrid electric vehicle". Journal of Power Sources. Oct. 7, 2021. vol. 514. Elsevier, Amsterdam, Netherlands.
Takuji Imai, "Yokogawa and NAIST Reinforcement Learning for Chemical Plants Achieves Advanced Control with Fewer Trials", Feb. 10, 2019, NIKKEI Robotics Mar. 2019 issue, https://xtech.nikkei.com/atcl/nxt/mag/rob/18/012600001/00018/.

* cited by examiner

| TI001 | TI002 | TI003 | FI001 | FI002 | V001 | ACTION | WEIGHT |
|---|---|---|---|---|---|---|---|
| −2.47803 | −2.48413 | −0.07324 | 29.71191 | 24.2511 | 70 | 1 | 144.1484 |
| −2.48413 | −2.47803 | 2.972412 | 31.04248 | 27.4251 | 71 | −1 | −218.316 |
| −2.48413 | −2.48413 | 5.583271 | 31.88477 | 27.89047 | 70 | −1 | 117.1561 |
| −2.49023 | −2.48413 | 11.13281 | 32.71484 | 26.479 | 70 | 1 | −252.506 |
| −2.49634 | −2.48413 | 15.80811 | 33.48999 | 32.89337 | 74 | −3 | 82.16214 |
| −2.49023 | −2.48413 | 24.21265 | 33.97827 | 30.67796 | 68 | −3 | 154.4256 |
| −2.48413 | −2.48413 | 27.69775 | 32.06177 | 26.53965 | 64 | −3 | 156.0428 |
| −2.49023 | −0.37842 | 28.45459 | 30.33447 | 29.70328 | 66 | −3 | 75.27125 |
| −2.49023 | 4.937744 | 29.23584 | 29.93164 | 27.62347 | 64 | −1 | −491.443 |
| −1.5625 | 9.039307 | 28.79028 | 27.83203 | 19.13351 | 53 | −3 | −203.099 |
| −0.53711 | 10.47363 | 27.36206 | 25.67139 | 21.08102 | 51 | 3 | 198.1082 |
| 1.062012 | 12.18872 | 25.64087 | 25.36011 | 21.30703 | 57 | 0 | 278.2919 |
| 5.255127 | 15.14282 | 22.67456 | 26.09863 | 22.49868 | 57 | 1 | 76.35704 |
| 9.875488 | 17.77954 | 23.05908 | 28.6438 | 22.48553 | 64 | −3 | 262.9233 |

*FIG.3*

| TI001 | TI002 | TI003 | FI001 | FI002 | V001 | ACTION |
|-------|-------|-------|-------|-------|------|--------|
| 0.1 | 0.2 | 0.4 | 0.3 | 0.8 | 0.2 | −3 |
| 0.1 | 0.2 | 0.4 | 0.3 | 0.8 | 0.2 | −1 |
| 0.1 | 0.2 | 0.4 | 0.3 | 0.8 | 0.2 | 0 |
| 0.1 | 0.2 | 0.4 | 0.3 | 0.8 | 0.2 | 1 |
| 0.1 | 0.2 | 0.4 | 0.3 | 0.8 | 0.2 | 3 |

*FIG.4*

| INDEX | TIME STAMP | TI001 | TI002 | TI003 | FI001 | FI002 | VO01 | TEACHER SIGNAL |
|---|---|---|---|---|---|---|---|---|
| 0 | 2021-01-01 00:00:00 | 0.892677 | 0.552777 | 0.505842 | 0.489088 | 0.957088 | 0.511441 | 0.964006851 |
| 1 | 2021-01-01 00:00:01 | 0.507037 | 0.15526 | 0.128789 | 0.832766 | 0.702723 | 0.277134 | 0.101947613 |
| 2 | 2021-01-01 00:00:02 | 0.345927 | 0.108979 | 0.389697 | 0.650921 | 0.995967 | 0.084625 | 0.260457653 |
| 3 | 2021-01-01 00:00:03 | 0.227886 | 0.619465 | 0.741711 | 0.604642 | 0.789895 | 0.721448 | 0.278033939 |
| 4 | 2021-01-01 00:00:04 | 0.507884 | 0.333398 | 0.836356 | 0.615725 | 0.193785 | 0.884805 | 0.210037865 |
| 5 | 2021-01-01 00:00:05 | 0.241597 | 0.614772 | 0.485105 | 0.528186 | 0.808634 | 0.172909 | 0.334898248 |
| 6 | 2021-01-01 00:00:06 | 0.793304 | 0.897222 | 0.859137 | 0.236002 | 0.637651 | 0.084774 | 0.20264368 |

*FIG.7*

START

STATE DATA IS ACQUIRED — S802

OPERATION MODEL OUTPUT IS ACQUIRED — S804

INDEX IS ACQUIRED — S806

OPERATION MODEL OUTPUT IS CORRECTED — S808

MANIPULATED VARIABLE IS OUTPUT — S810

END

CONTROL APPARATUS, CONTROL METHOD, AND NON-TRANSITORY COMPUTER READABLE MEDIUM

The contents of the following Japanese patent application(s) are incorporated herein by reference:

NO. 2022-072211 filed in JP on Apr. 26, 2022

BACKGROUND

1. Technical Field

The present invention relates to a control apparatus, a control method, and a non-transitory computer readable medium.

2. Related Art

Patent Document 1 discloses that "the model 45 outputs a recommended control parameter indicating the first type of control content recommended for increasing the reward value in response to input of the measurement data". In addition, Non-Patent Document 1 discloses "FKDPP (Factorial Kernel Dynamic Policy Programming)".

PRIOR ART DOCUMENT

Patent Document

Patent Document 1: Japanese Patent Application Publication No. 2021-086283

Patent Document 2: Japanese Patent Application Publication No. 2020-027556

Patent Document 3: Japanese Patent Application Publication No. 2019-020885

Non-Patent Document

Non-Patent Document 1: "Yokogawa Electric and NAIST for Reinforcement Learning for Chemical Plants", Nikkei Robotics, March 2019

SUMMARY

A first aspect of the present invention provides a control apparatus. The control apparatus may include a model output acquisition unit configured to acquire an operation model output which is output according to inputting state data indicating a state of a facility, to an operation model trained by machine learning to output an action in accordance with the state of the facility by using simulation data from a simulator that simulates an operation in the facility. The control apparatus may include an index acquisition unit configured to acquire an index which is calculated by using real data from the facility and which is for monitoring a difference between a behavior of the simulator and an actual operation in the facility. The control apparatus may include a correction unit configured to correct the operation model output based on the index. The control apparatus may include a control unit configured to output a manipulated variable for controlling a control target provided in the facility, according to the corrected operation model output.

The index acquisition unit may be configured to acquire, as the index, a monitoring model output which is output according to inputting the state data, to a monitoring model trained by the machine learning to output the index in accordance with the state of the facility by using the real data.

The monitoring model may be a machine learning model trained by supervised learning such that a difference between an output of the monitoring model and a teacher signal is small.

The control apparatus may further include a monitoring model learning unit configured to generate the monitoring model by the supervised learning.

The operation model may be a machine learning model trained by reinforcement learning to output an action that increases a reward value which is determined by a reward function.

The control apparatus may further include an operation model learning unit configured to generate the operation model by the reinforcement learning.

The index acquisition unit may be configured to acquire, as the index, a future prediction value of a sensor which is included in the state data, or a future prediction value of a sensor which is predictable from the state data.

The index acquisition unit may be configured to acquire, as the index, a value obtained by quantifying a quality of a product or a semi-finished product manufactured at the facility.

The control apparatus may further include a correction condition setting unit configured to set a condition for correcting the operation model output.

The condition may include an allowable range of the index. the correction unit may be configured to correct, when the index is out of the range, the operation model output for the index to be in a direction toward an inside of the range.

The index acquisition unit may be configured to acquire, as the index, a calculation value calculated by the simulator.

The correction unit may be configured to correct the operation model output, by using a correction function that includes, in a correction term, a difference between an actual measurement value which is indicated by the state data, and the calculation value.

A second aspect of the present invention provides a control method. The control method may be executed by a computer. The control method may include acquiring, by the computer, an operation model output which is output according to inputting state data indicating a state of a facility, to an operation model trained by machine learning to output an action in accordance with the state of the facility by using simulation data from a simulator that simulates an operation in the facility. The control method may include acquiring, by the computer, an index which is calculated by using real data from the facility and which is for monitoring a difference between a behavior of the simulator and an actual operation in the facility. The control method may include correcting, by the computer, the operation model output based on the index. The control method may include outputting, by the computer, a manipulated variable for controlling a control target provided in the facility, according to the corrected operation model output.

A third aspect of the present invention provides a non-transitory computer readable medium having a control program recorded thereon. The control program may be executed by a computer. The control program may cause the computer to function as a model output acquisition unit configured to acquire an operation model output which is output according to inputting state data indicating a state of a facility, to an operation model trained by machine learning to output an action in accordance with the state of the facility by using simulation data from a simulator that simulates an operation in the facility. The control program may cause the computer to function as an index acquisition unit configured to acquire an index which is calculated by using real data from the facility and which is for monitoring a difference between a behavior of the simulator and an actual operation in the facility. The control program may cause the computer to function as a correction unit configured to correct the operation model output based on the index. The control program may cause the computer to function as a control unit configured to output a manipulated variable for controlling a control target provided in the facility, according to the corrected operation model output.

The summary clause does not necessarily describe all necessary features of the embodiments of the present invention. The present invention may also be a sub-combination of the features described above.

BRIEF DESCRIPTION OF THE DRAWINGS

FIG. 3 shows an example of a data table that an operation model may have.

FIG. 4 shows an example of an action table for determining an action by using the operation model.

FIG. 7 shows an example of supervised learning data used to generate a monitoring model.

DESCRIPTION OF EXEMPLARY EMBODIMENTS

Hereinafter, (some) embodiment(s) of the present invention will be described. The embodiment(s) do(es) not limit the invention according to the claims. In addition, not all of the combinations of features described in the embodiments are essential to solving means of the invention.

Figure 1:
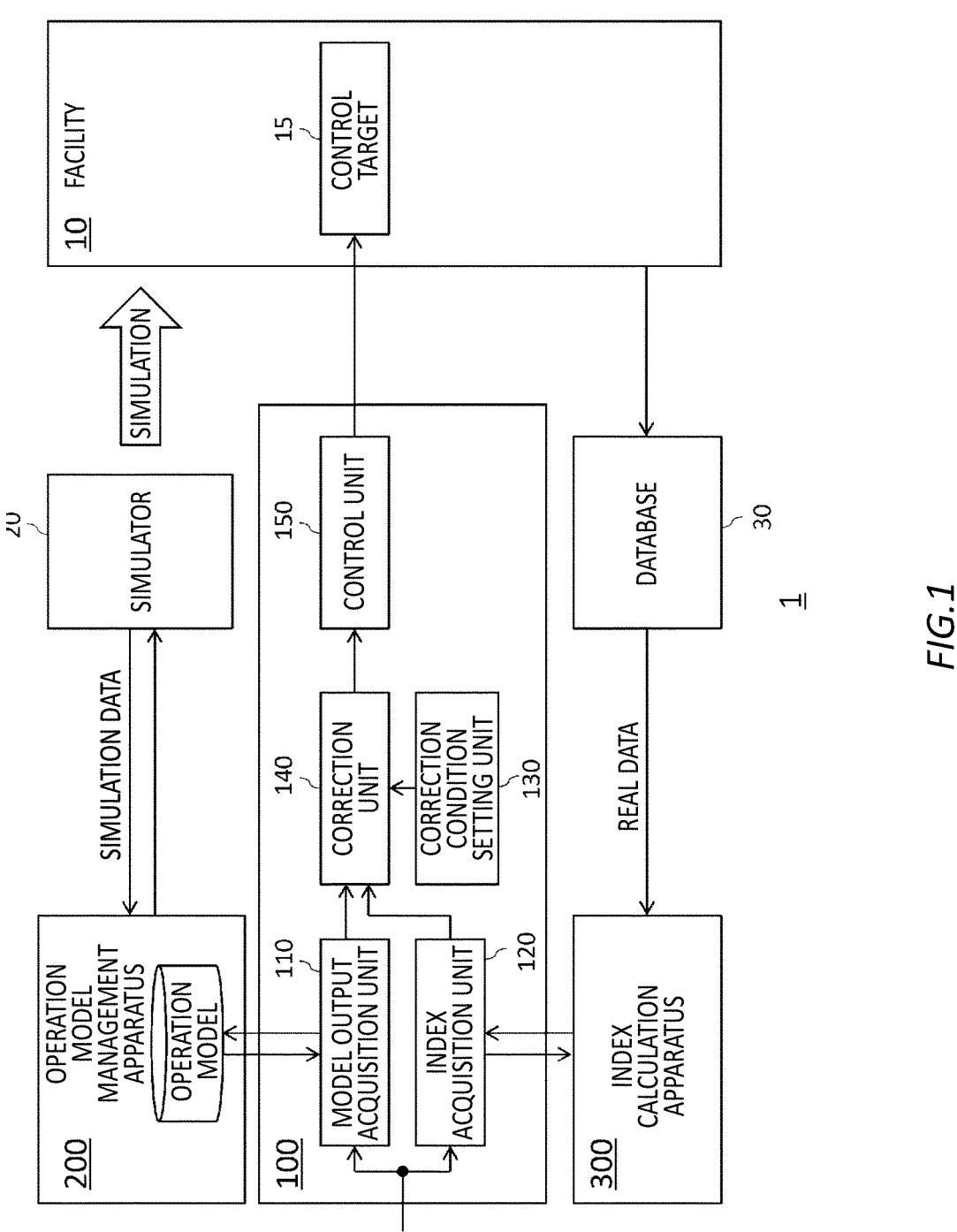
FIG. 1 shows an example of a block diagram of a control system 1 that may include a control apparatus 100 according to the present embodiment.

FIG. 1 shows an example of a block diagram of a control system 1 that may include a control apparatus 100 according to the present embodiment. It should be noted that these blocks are functional blocks that are each functionally separated, and may not be necessarily required to be matched with actual apparatus configurations. That is, in the present drawing, an apparatus indicated by one block may not be necessarily required to be configured by one apparatus. In addition, in the present drawing, apparatuses indicated by separate blocks may not be necessarily required to be configured by separate apparatuses. Block diagrams described below will be similar.

The control system 1 may include a facility 10, a simulator 20, a database 30, a control apparatus 100, an operation model management apparatus 200, and an index calculation apparatus 300.

The facility 10 is a facility or an apparatus provided with a control target 15. For example, the facility 10 may be a plant, or may be a complex apparatus in which a plurality of pieces of equipment are combined. Here, an example of the plant includes: in addition to an industrial plant such as a chemical plant and a biotechnology plant, a plant for managing and controlling a well site such as a gas field or an oil field and its surrounding area; a plant for managing and controlling power generation such as hydroelectric, thermal, or nuclear power generation; a plant for managing and controlling energy harvesting from solar power, wind power, or the like; a plant for managing and controlling water and sewerage, dams, or the like; and others.

As an example, a case where the facility 10 is a distillation apparatus that is one of process apparatuses will be described below. Typically, the distillation apparatus evaporates a low-boiling component in a distillation column to extract the evaporated low-boiling component from a top of the column, and condenses a vapor of the extracted low-boiling component by a condenser to store the condensed vapor in a reflux drum. Then, the distillation apparatus refluxes a part stored in the reflux drum, into the distillation column, to be brought into contact with the vapor in the distillation column, and to be distilled into a low-boiling component and a high-boiling component. In such a distillation apparatus, as an example, a valve provided between the reflux drum and the distillation column is controlled to be opened and closed in order to control an amount of reflux.

The control target 15 is equipment that is provided in the facility 10 and that is a target for the control. For example, the control target 15 may be an actuator, that is, an operation terminal of a valve, a heater, a motor, a fan, a switch, and the like which control at least one physical quantity such as an amount, a temperature, a pressure, a flow rate, a speed, and a pH of an object, in a process of the facility 10, and the control target 15 performs a given operation in accordance with a manipulated variable. As an example, a case where the control target 15 is a valve provided between the reflux drum and the distillation column in the distillation apparatus, will be described below. However, the present invention is not limited to this. The control target 15 may be a controller that controls the operation terminal. That is, the term "control" which is used in the present specification may be broadly interpreted to include an indirect control of the operation terminal via a controller, in addition to a direct control of the operation terminal.

The facility 10 provided with the control target 15 may be provided with one or more sensors capable of measuring various states (physical quantities) inside and outside the facility 10. As an example, when the facility 10 is the distillation apparatus, the sensors may output process variables PVs (Process Variable) obtained by measuring the temperatures at various positions (for example, the top of the column, the center of the column, a bottom of the column, or the like), flow rates in various paths, or the like of the distillation apparatus. State data indicating a state of the facility 10 may include such a process variable PV. The state data may also include a manipulated variable MV (Manipulated Variable) indicating a degree of opening and closing of the valve which is the control target 15. In addition to operation data indicating an operation state as a result of controlling the control target 15 in this way, the state data may include consumption amount data indicating an amount of consumption of energy and a raw material in the facility 10, and disturbance environment data indicating the physical quantity which may act as a disturbance on the control of the control target 15, or the like.

The distillation apparatus is one of apparatuses which are very widely used in petroleum and chemical processes, but has a feature of a strong mutual interference between the top of the column and the bottom of the column, a long time constant, and a non-linear operation. In such a case where the valve is controlled to be opened and closed by a PID (Proportional Integral Differential) or the like to control the amount of the reflux in the distillation apparatus, it is difficult to enhance controllability. In addition, in a case where a worker sets, as a purpose, a plurality of items such as a quality assurance, energy saving, a GHG (GreenHouse Gas) reduction, and a yield enhancement, and manually operates such a valve, a degree to which the valve is controlled to be opened and closed largely depends on an experience and an intuition of the worker.

Therefore, in controlling the opening and closing of such a valve, it is conceivable to use a machine learning model which is generated by machine learning. The control apparatus 100 according to the present embodiment may use, for example, an output of such a machine learning model as a target for a correction which will be described below.

The simulator 20 simulates an operation in the facility 10. For example, the simulator 20 may be designed based on design information on the facility 10, and executes a behavior obtained by simulating the operation in the facility 10. By acquiring a signal obtained by simulating a manipulated variable for the control target 15, an environment changes, and the simulator 20 outputs simulation data obtained by simulating the state (for example, a prediction value of the sensor) in the facility 10. As an example, the simulator 20 may be configured by a prediction model that predicts a state of the distillation apparatus, and a plant control simulator. The prediction model may be capable of predicting a state change of a reactor from accumulated process data by using modeling technology for time-series data which uses deep learning. In addition, the plant control simulator may be capable of virtually simulating a PID control that derives the manipulated variable MV by a difference between a set point variable SV and a controlled variable CV for the control target 15. That is, the simulator 20 may be capable of simulating the behavior itself in the facility 10, in addition to a state prediction value.

The database 30 accumulates state data (also referred to as "real data" or "historical data") obtained directly or indirectly from the sensor or the like provided in the facility 10, when the facility 10 is actually operated.

The control apparatus 100 may be a computer such as a PC (a personal computer), a tablet type computer, a smartphone, a workstation, a server computer, or a general purpose computer, or may be a computer system in which a plurality of computers are connected. Such a computer system is also a computer in a broad sense. In addition, the control apparatus 100 may be implemented by one or more virtual computer environments which are able to be run on the computer. Instead of this, the control apparatus 100 may be a dedicated computer designed to control the control target 15, or may be dedicated hardware realized by dedicated circuitry. In addition, in a case where a connection to the Internet is possible, the control apparatus 100 may be realized by cloud computing.

The control apparatus 100 controls the control target 15 by using an operation model trained by the machine learning by using the simulation data. At this time, the control apparatus 100 according to the present embodiment acquires an index for monitoring a difference (a deviation) between the behavior of the simulator 20 and an actual operation in the facility 10, to correct an output of the operation model, based on the index. The control apparatus 100 includes a model output acquisition unit 110, an index acquisition unit 120, a correction condition setting unit 130, a correction unit 140, and a control unit 150.

The model output acquisition unit 110 is configured to acquire an operation model output which is output according to inputting the state data indicating the state of the facility 10, to an operation model trained by the machine learning to output an action in accordance with the state of the facility 10 by using the simulation data from the simulator 20 that simulates the operation in the facility 10. For example, the model output acquisition unit 110 may acquire such an operation model output via a network from the operation model management apparatus 200 that manages the operation model. The details of the operation model management apparatus 200 will be described below. The model output acquisition unit 110 supplies the acquired operation model output to the correction unit 140.

The index acquisition unit 120 is configured to acquire the index which is calculated by using the real data from the facility 10 and which is for monitoring the difference between the behavior of the simulator 20 and the actual operation in the facility 10. For example, the index acquisition unit 120 may acquire such an index from the index calculation apparatus 300 that is capable of calculating the index, via the network. The details of the index calculation apparatus 300 will be described below. The index acquisition unit 120 supplies the acquired index to the correction unit 140.

The correction condition setting unit 130 is configured to set a condition for correcting the operation model output. For example, the correction condition setting unit 130 may acquire such a condition via a user input. The correction condition setting unit 130 supplies the set condition to the correction unit 140.

The correction unit 140 is configured to correct the operation model output acquired by the model output acquisition unit 110, based on the index acquired by the index acquisition unit 120. At this time, the correction unit 140 corrects the operation model output according to the condition set by the correction condition setting unit 130. The correction unit 140 supplies the corrected operation model output to the control unit 150.

The control unit 150 is configured to output the manipulated variable for controlling the control target 15 provided in the facility 10, according to the corrected operation model output. For example, when the control target 15 is a valve, the control unit 150 may output the degree of opening and closing of the valve. However, the present invention is not limited to this. The control unit 150 may output various control inputs that may change the controlled variable. That is, the term "manipulated variable" which is used in the present specification may be broadly interpreted to include the set point variable SV and another control parameter (for example, a PID parameter), in addition to the so-called MV.

Figure 2:
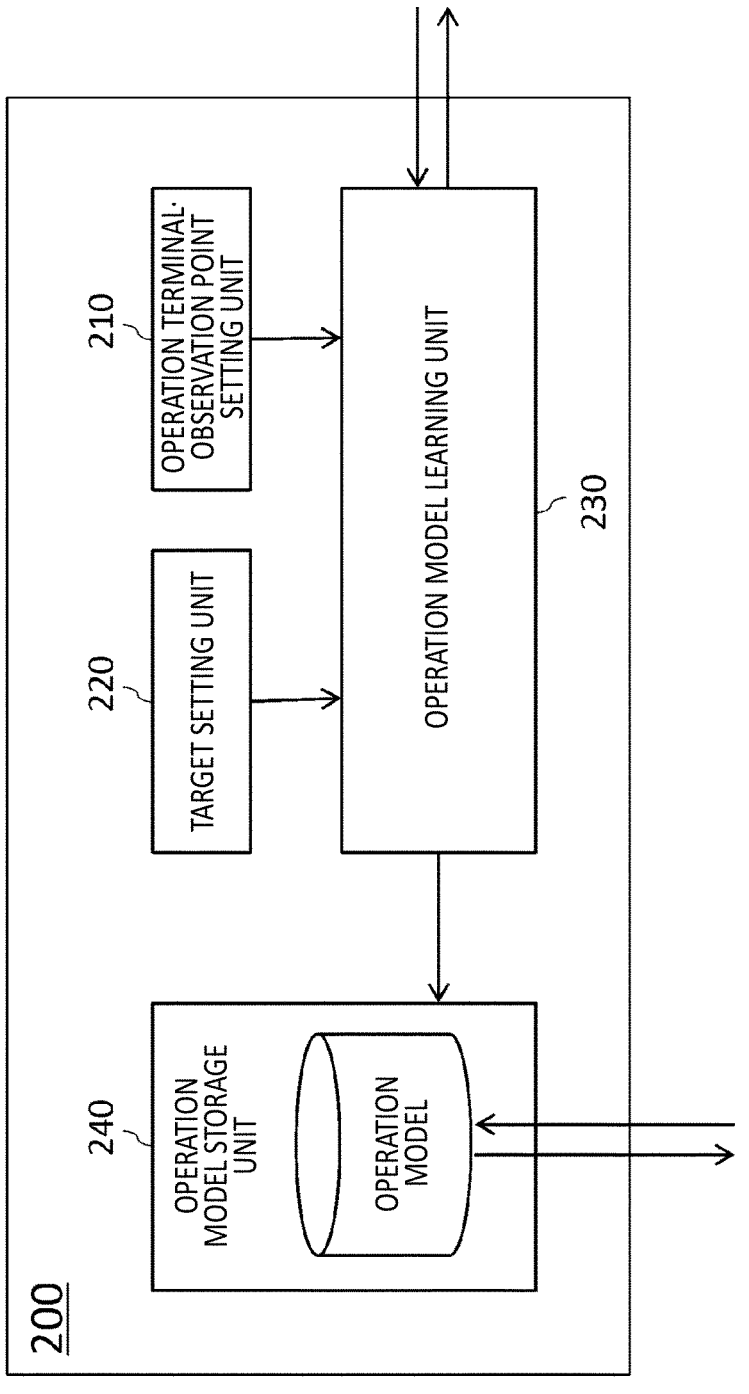
FIG. 2 shows an example of a block diagram of an operation model management apparatus 200.

FIG. 2 shows an example of a block diagram of an operation model management apparatus 200. The operation model management apparatus 200 may also be a computer, similarly to the control apparatus 100, or may be a computer system in which a plurality of computers are connected. In addition, the operation model management apparatus 200 may be implemented by one or more virtual computer environments which are able to be run on the computer. Instead of this, the operation model management apparatus 200 may be a dedicated computer designed to manage the operation model, or may be dedicated hardware realized by dedicated circuitry. In addition, in a case where a connection to the Internet is possible, the operation model management apparatus 200 may be realized by cloud computing.

The operation model management apparatus 200 manages the operation model trained by the machine learning to output the action in accordance with the state of the facility 10 by using the simulation data from the simulator 20 that simulates the operation in the facility 10. The operation model management apparatus 200 includes an operation terminal observation point setting unit 210, a target setting unit 220, an operation model learning unit 230, and an operation model storage unit 240.

The operation terminal observation point setting unit 210 sets information of the operation terminal which is an operation target, and information of an observation point which is used for learning. For example, the operation terminal observation point setting unit 210 may acquire a tag name of the operation terminal and a tag name of the observation point, via the user input. At this time, a user may select the tag name from a tag list prepared in advance, or may directly input the tag name. The operation terminal observation point setting unit 210 supplies the set information to the operation model learning unit 230.

The target setting unit 220 sets a set point variable and a reward function. For example, the target setting unit 220 may acquire the set point variable SV of the controlled variable CV, and the reward function for quantifying whether the selected action is good or bad, via the user input. At this time, as an example, the reward function may include, at least in a part, a component of a difference between the set point variable and the controlled variable, such as a constant×[SV-CV] or a constant×(SV-CV)^2. That is, the reward function may be set such that the closer the controlled variable approaches the set point variable, the higher a reward value which is a calculation result. The target setting unit 220 supplies the set information to the operation model learning unit 230.

The operation model learning unit 230 generates the operation model by the machine learning. For example, the operation model learning unit 230 may acquire setting information from the operation terminal observation point setting unit 210 and the target setting unit 220. In addition, the operation model learning unit 230 may acquire the simulation data from the simulator 20. Then, the operation model learning unit 230 may generate the operation model, by the machine learning to use the simulation data to output the action in accordance with the state of the facility 10, according to the setting information. Here, the generated operation model may be a machine learning model trained by reinforcement learning to output the action that increases the reward value which is determined by the reward function. The details of such reinforcement learning will be described below.

The operation model storage unit 240 stores the operation model. For example, the operation model storage unit 240 stores the operation model generated by the operation model learning unit 230. It should be noted that in the above description, the case where the operation model storage unit 240 stores the operation model generated inside the operation model management apparatus 200, is shown as an example; however, the present invention is not limited to this. The operation model storage unit 240 may store the operation model generated outside the operation model management apparatus 200.

FIG. 3 shows an example of a data table that an operation model may have. The data table may be constituted by a combination of the state of the facility 10 and the action, and a weight for the combination. In the present drawing, in the operation terminal observation point setting unit 210, a case where the tag name of the operation terminal is set as "V001" and the tag names of the observation points are set as "TI001", "TI002", "TI003", "FI001", and "FI002" is shown as an example. In such a case, the state of the facility 10 may be represented as state data S=(TI001, TI002, TI003, FI001, FI002, V001).

In addition, an action may be represented as an amount of change of the manipulated variable MV at the operation terminal. For example, when the manipulated variable MV (that is, a value of the tag "V001") at the operation terminal at a time a is 70, and the manipulated variable MV at a time b following the time a is 71, the manipulated variable MV is shown to change from the state of 70 to the state of 71, from the time a to the time b. Here, when the manipulated variable MV=70 at the time a is subtracted from the manipulated variable MV=71 at a time b, a changed manipulated variable ΔMV=1 is established. In this case, the action at the time a may be represented as action data A=1.

In addition, the weight may be represented as weight data W calculated by the reward value determined by the reward function set in the target setting unit 220. It should be noted that at the beginning, the weight data W may be set to an initial value (for example, 1) and overwritten sequentially as learning progresses.

In this way, the data table of the operation model may save each of a plurality of pieces of sample data constituted by a combination of the state data S=(TI001, TI002, TI003, FI001, FI002, V001) and the action data A=ΔMV, and the weight data W for the combination.

As an example, in a case of focusing on a first line in the present drawing, when the action of A=1 (for example, rotation control by 1% in a counterclockwise direction which is a direction to open the valve) is taken, under a state of S=(−2.47803, −2.48413, −0.07324, 29.71191, 24.2511, 70), it means that the weight is W=144.1484. A next action is determined by using the operation model having such a data table.

FIG. 4 shows an example of an action table for determining an action by using the operation model. The action table may be constituted by the state data S and the action data A of the action which may be taken. In the present drawing, as an example, a case where the state of the facility 10 is S=(0.1, 0.2, 0.4, 0.3, 0.8, 0.2), and there are five options of A=[−3, −1, 0, 1, 3] for the action which may be taken, that is, five of [close by 3%, close by 1%, no change, open by 1%, open by 3%], is shown. For example, a next action is determined, by inputting the action table as shown in the present drawing into the operation model having the data table as shown in FIG. 3. A method for generating such an operation model will be described in detail by using a flow.

Figure 5:
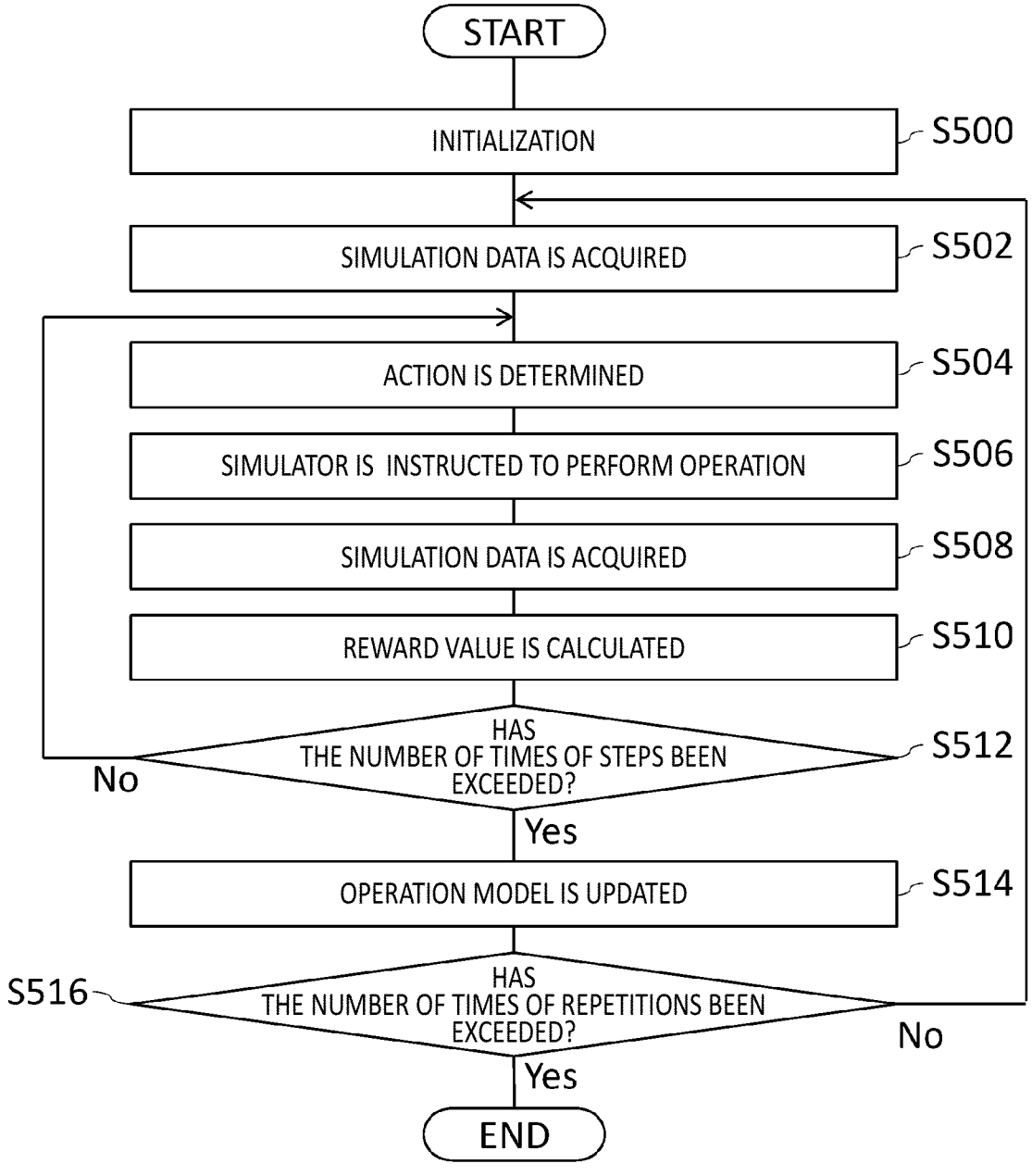
FIG. 5 shows an example of a flow of generating the operation model by reinforcement learning.

FIG. 5 shows an example of a flow of generating the operation model by reinforcement learning. In step S500, the operation model management apparatus 200 initializes the operation model. For example, the operation model learning unit 230 creates an empty data table in the operation model storage unit 240. Then, the operation model learning unit 230 reads the tag name of the operation terminal and the tag name of the observation point which are set in the operation terminal observation point setting unit 210, and defines a column of the data table by the tag name, the action, and the weight. In addition, the operation model learning unit 230 acquires the plurality of pieces of sample data as initial learning samples, and adds the plurality of pieces of sample data to respective rows of the data table. At this time, the operation model learning unit 230 may set the weight data W to the initial value for the initial learning sample.

In step S502, the operation model management apparatus 200 acquires the simulation data. For example, the operation model learning unit 230 acquires the simulation data obtained by simulating the state of the facility 10, from the simulator 20 that is a learning environment, via a network.

In step S504, the operation model management apparatus 200 determines the action. For example, the operation model learning unit 230 may randomly determine the action. However, the present invention is not limited to this. The operation model learning unit 230 may use a known AI algorithm, for example, such as FKDPP in determining the action. When such a kernel method is used, the operation model learning unit 230 generates a vector of the state data S from the prediction value of the sensor obtained by the simulation data. Then, the operation model learning unit 230 respectively combines the state data S with the entire action data A which may be taken, and generates the action table, for example, as shown in FIG. 4. Then, the operation model learning unit 230 inputs the action table to the operation model. According to this, the operation model performs a kernel calculation between each row of the action table, and each row of the data table in which the weight column is excluded, and calculates a distance to each piece of sample data. Then, the operation model sequentially adds a value obtained by multiplying the distance calculated for each piece of sample data, by the value of each weight column, and calculates the reward value (an expected reward value) for each action. The operation model selects the action by which the reward value calculated in this way becomes the highest. For example, in this way, the operation model learning unit 230 may determine the action, by using the operation model during an update to select the action by which the reward value becomes the highest. At a time of learning, the operation model learning unit 230 may determine the action while appropriately selecting whether to determine the action randomly, or to determine the action by using the operation model.

In step S506, the operation model management apparatus 200 instructs the simulator 20 to perform the operation. For example, the operation model learning unit 230 provides the simulator 20 with a new manipulated variable obtained by adding the action determined in step S504 to an immediately preceding manipulated variable at the operation terminal of the learning environment. This changes the state of the learning environment.

In step S508, the operation model management apparatus 200 acquires the simulation data. For example, the operation model learning unit 230 acquires the simulation data obtained by simulating the state of the facility 10 from the simulator 20, as in step S502. That is, the operation model learning unit 230 acquires the state of the learning environment after a change according to the manipulated variable being provided based on the determined action.

In step S510, the operation model management apparatus 200 calculates the reward value. For example, the operation model learning unit 230 calculates the reward value by using the reward function set by the target setting unit 220.

In step S512, the operation model management apparatus 200 determines whether the number of times of steps has been exceeded. For example, the operation model learning unit 230 determines whether processing of acquiring the state in accordance with the determination of the action has exceeded the specified number of times of steps. It should be noted that the number of times of steps described above may be specified in advance by the user, or may be determined based on a target period of learning (for example, 10 days or the like). If the processing described above is not determined to have exceeded the number of times of steps (if No), the operation model management apparatus 200 returns the processing to step S504 and continues the flow. The operation model management apparatus 200 executes the specified number of times of steps of such processing of acquiring the state in accordance with the determination of the action.

In step S512, if the processing described above is determined to have exceeded the number of times of steps (if Yes), the operation model management apparatus 200 advances the processing to step S514. In step S514, the operation model management apparatus 200 updates the operation model. For example, other than overwriting the value of the weight column in the data table shown in FIG. 3, the operation model learning unit 230 adds new sample data which has not been saved up to this point of time, to a new row in the data table.

In step S516, the operation model management apparatus 200 determines whether the number of times of repetitions has been exceeded. For example, the operation model learning unit 230 determines whether the update processing of the operation model has exceeded the specified number of times of repetitions. It should be noted that the number of times of repetitions described above may be specified in advance by the user, or may be determined according to validity of the operation model. If the processing described above is not determined to have exceeded the number of times of repetitions (if No), the operation model management apparatus 200 returns the processing to step S502 and continues the flow.

In step S516, if the processing described above is determined to have exceeded the number of times of repetitions (if Yes), the operation model management apparatus 200 ends the flow. The operation model management apparatus 200 can generate the operation model that outputs the action in accordance with the state of the facility 10, for example, in this way, by performing the reinforcement learning to output the action that increases the reward value which is determined by the reward function.

The operation model generated in this way is trained by the learning based on the behavior of the simulator 20. Accordingly, even when a situation in which the behavior of the simulator 20 and the actual operation in the facility 10 are different from each other, the operation model outputs the action premised on the behavior of the simulator 20. As a result, a situation in which the control target 15 is provided with the manipulated variable that is not suitable for the actual operation in the facility 10, may occur. In such a case, in comparison to a case where the worker manually performs the operation, various problems such as a decrease in operating efficiency, a deterioration in product quality, and an increase in risk of a dangerous state, may occur. Accordingly, it is important to monitor the behavior of the simulator 20 on which the operation model is premised, in comparison to the actual operation in the facility 10, and to reflect a monitoring result in the control of the control target 15 when there occurs a difference between the two.

Figure 6:
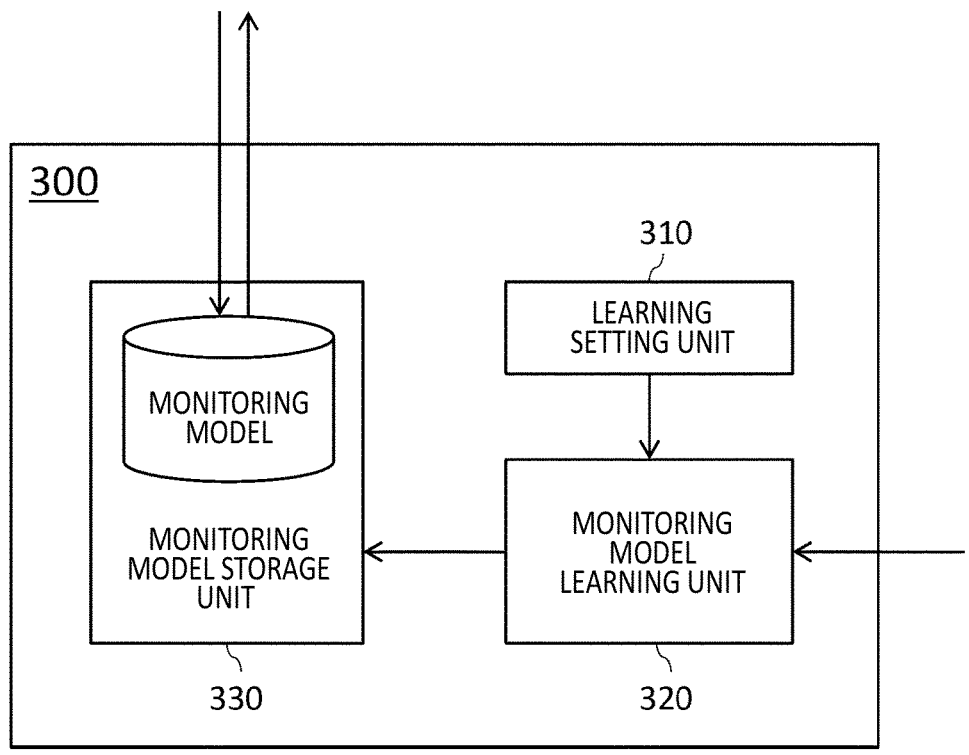
FIG. 6 shows an example of a block diagram of an index calculation apparatus 300.

FIG. 6 shows an example of a block diagram of an index calculation apparatus 300. The index calculation apparatus 300 may also be a computer, similarly to the control apparatus 100, or may be a computer system in which a plurality of computers are connected. In addition, the index calculation apparatus 300 may be implemented by one or more virtual computer environments which are able to be run on the computer. Instead of this, the index calculation apparatus 300 may be a dedicated computer designed to calculate the index, or may be dedicated hardware realized by dedicated circuitry. In addition, in a case where a connection to the Internet is possible, the index calculation apparatus 300 may be realized by cloud computing.

The index calculation apparatus 300 calculates the index for monitoring the difference between the behavior of the simulator 20 and the actual operation in the facility 10, by using the real data obtained when the facility 10 is actually operated. Here, a case where the index calculation apparatus 300 uses a monitoring model which is the machine learning model, to calculate such an index, will be described as an example. The index calculation apparatus 300 includes a learning setting unit 310, a monitoring model learning unit 320, and a monitoring model storage unit 330.

The learning setting unit 310 sets information defining the state data used for learning, a hyperparameter of a learning algorithm, and information of a teacher signal. For example, the learning setting unit 310 may acquire, via the user input, the tag name of the sensor used for learning, as the information defining the state data used for the learning. At this time, the user may select the tag name from the tag list prepared in advance, or may directly input the tag name.

In addition, for example, when a neural network model is used as the monitoring model, the learning setting unit 310 may acquire, as the hyperparameter of the learning algorithm, a structure of a neural network, a learning rate, an optimization algorithm, the number of epochs, a random number seed, and the like, via the user input. It should be noted that here, a case where the neural network is used as the learning algorithm of the monitoring model is shown as an example. However, the present invention is not limited to this. Another algorithm such as a decision tree, may be used, for example, in learning of the monitoring model.

In addition, the learning setting unit 310 may acquire, as the information of the teacher signal, via the user input, information of any signal which is desired to be caused to regress by the user in relation to the operation in the facility 10. At this time, the user may input a value of the teacher signal itself, or may input a mathematical expression to derive the value of the teacher signal. As an example, such a teacher signal may be a future (for example, five steps ahead) prediction value of the sensor which is included in the state data indicating the state of the facility 10, or may be a future prediction value of the sensor, that is, a soft sensor, which is predictable from the state data. Instead of this, or in addition to this, the teacher signal may be a quality of a product or a semi-finished product manufactured at the facility 10 which is predictable (to be quantified) from the state data. In this way, the teacher signal may be any signal which is desired to be caused to regress in relation to the operation in the facility 10, as long as the signal is predictable from the state data. The learning setting unit 310 supplies the set information to the monitoring model learning unit 320.

The monitoring model learning unit 320 is configured to generate the monitoring model by the machine learning. For example, the monitoring model learning unit 320 may acquire the setting information from the learning setting unit 310. In addition, the monitoring model learning unit 320 may acquire, from the database 30, the real data obtained when the facility 10 is actually operated. Then, the monitoring model learning unit 320 may generate the monitoring model, by the machine learning to output the index in accordance with the state of the facility 10 by using the real data, according to the setting information. Here, the generated monitoring model may be a machine learning model trained by supervised learning such that a difference between the output of the monitoring model and the teacher signal is small. The details of such supervised learning will be described below.

The monitoring model storage unit 330 stores the monitoring model. For example, the monitoring model storage unit 330 stores the monitoring model generated by the monitoring model learning unit 320. It should be noted that in the above description, the case where the monitoring model storage unit 330 stores the monitoring model generated inside the index calculation apparatus 300, is shown as an example; however, the present invention is not limited to this. The monitoring model storage unit 330 may store the monitoring model generated outside the index calculation apparatus 300.

It should be noted that in the present embodiment, a case where only one index is used as the index for monitoring the behavior of the simulator 20 is described, as an example; however, the present invention is not limited to this. A plurality of indices may be used as such indices. In this case, the monitoring model storage unit 330 may store a plurality of monitoring models which respectively output indices different from each other.

FIG. 7 shows an example of supervised learning data used to generate a monitoring model. In the present drawing, in the learning setting unit 310, a case where the tag names of sensors used for learning are set as "TI001", "TI002", "TI003", "FI001", "FI002", and "V001" is shown as an example. In these columns, the real data acquired from the database 30, that is, each value of the state data obtained when the facility 10 is actually operated, is input in time series. In addition, the value of the teacher signal set in the learning setting unit 310 is input in time series in a column of the "teacher signal". The monitoring model learning unit 320 may generate the monitoring model, for example, by using such learning data to perform the supervised learning.

More specifically, the monitoring model learning unit 320 performs initial setting on the monitoring model according to the structure of the neural network, the learning rate, the optimization algorithm, the number of epochs, and the random number seed which are set in the learning setting unit 310. At this time, the monitoring model learning unit 320 may set the state data to S=(TI001, TI002, TI003, FI001, FI002, V001), and set w to the weight of the neural network, to create the neural network model which is set as F(S, w). Then, the monitoring model learning unit 320 may initialize a weight w by a random number. Then, the monitoring model learning unit 320 may divide the learning data, for example, as shown in the present drawing into the column of the state data and the column of the teacher signal, and use the column of the state data to generate a feature quantity. Then, the monitoring model learning unit 320 may calculate F(S, w) for each row of the state data S. Then, the monitoring model learning unit 320 may compare an output y of F(S, w) and a teacher signal y', and use the optimization algorithm and the learning rate to reduce the difference between them, to update the weight w of the neural network. The monitoring model learning unit 320 may repeat such update processing of the weight w the number of times specified by the number of epochs.

The control apparatus 100 according to the present embodiment acquires the output y of the monitoring model generated, for example, in this way, as the index for monitoring the behavior of the simulator 20 on which the operation model is premised, to correct the operation model output. The details of this are described by using a flow.

Figure 8:
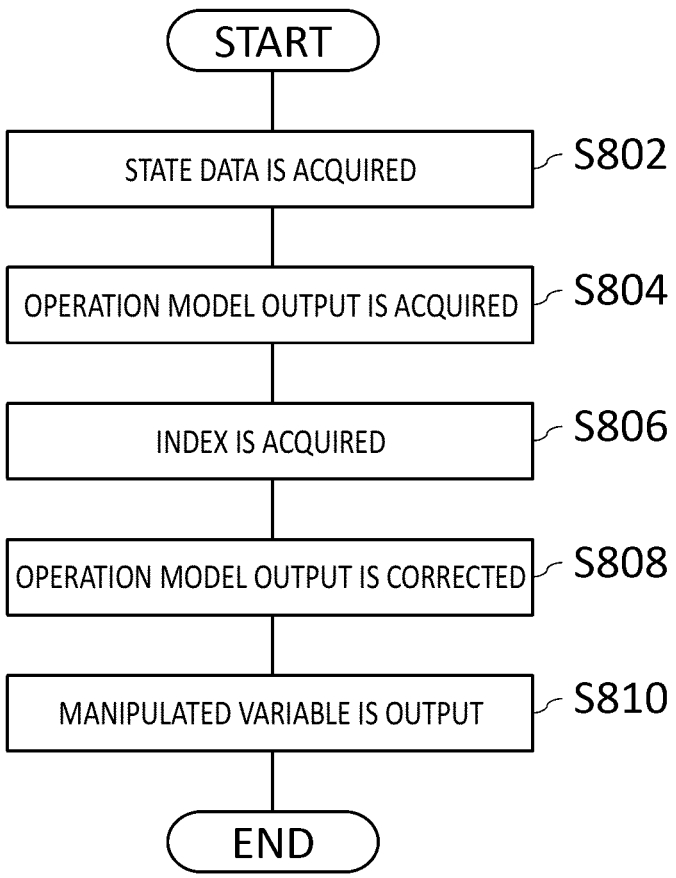
FIG. 8 shows an example of a control flow by the control apparatus 100 according to the present embodiment.

FIG. 8 shows an example of a control flow by the control apparatus 100 according to the present embodiment. In step S802, the control apparatus 100 acquires the state data. For example, the control apparatus 100 may acquire the state data S=(TI001, TI002, TI003, FI001, FI002, V001) indicating the state of the facility 10, from the facility 10 via the network in real time.

In step S804, the control apparatus 100 acquires the operation model output. For example, the model output acquisition unit 110 may input the state data S acquired in step S802 to the operation model which is stored in the operation model management apparatus 200. According to this, the operation model may use the FKDPP algorithm described above to select and output the action by which the reward value becomes the highest. The model output acquisition unit 110 may acquire the action which is output from the operation model, as an operation model output x. For example, in this way, the model output acquisition unit 110 can acquire the operation model output x which is output according to inputting the state data S indicating the state of the facility 10, to the operation model trained by the machine learning to output the action in accordance with the state of the facility 10 by using the simulation data from the simulator 20 that simulates the operation in the facility 10. The model output acquisition unit 110 supplies the acquired operation model output x to the correction unit 140.

In step S806, the control apparatus 100 acquires the index. For example, the index acquisition unit 120 may input the state data S acquired in step S802 to the monitoring model stored in the index calculation apparatus 300. According to this, the monitoring model may calculate F(S, w) to output y which is a calculation result. The index acquisition unit 120 may acquire the monitoring model output y as the index. For example, in this way, the index acquisition unit 120 may acquire, as the index, the monitoring model output y which is output according to inputting the state data S, to the monitoring model trained by the machine learning to output the index in accordance with the state of the facility by using the real data.

It should be noted that as described above, the monitoring model is trained by the machine learning such that a difference between the monitoring model output y and the teacher signal y' is small. Accordingly, the index acquisition unit 120 is configured to acquire, as the index, the future prediction value of the sensor which is included in the state data S, or the future prediction value of the sensor which is predictable from the state data S, when the teacher signal y' is set as the future prediction value of the sensor which is included in the state data S, or as the future prediction value of the soft sensor which is predictable from the state data S. Instead of this, or in addition to this, the index acquisition unit 120 is configured to acquire, as the index, a value obtained by quantifying the quality of the product or the semi-finished product manufactured at the facility 10, when the teacher signal y' is set as the quality of the product or the semi-finished product manufactured at the facility 10 which is predictable (to be quantified) from the state data S.

For example, in this way, the index acquisition unit 120 can acquire the index which is calculated by using the real data from the facility 10 and which is for monitoring the difference between the behavior of the simulator 20 and the actual operation in the facility 10. The index acquisition unit 120 supplies the acquired index, here, the monitoring model output y, to the correction unit 140.

In step S808, the control apparatus 100 corrects the operation model output. For example, the correction unit 140 may correct the operation model output x acquired in step S804, based on the index acquired in step S806, here, the monitoring model output y.

Here, it is assumed that the condition set by the correction condition setting unit 130 includes an allowable range of the index. As an example, it is assumed that in the correction condition setting unit 130, an alarm upper limit and an alarm lower limit for the monitoring model output y are set. In addition, it is assumed that a conditional expression for executing the correction is set as follows. It should be noted that such a conditional expression is an example of a case in which a relationship that y decreases as x increases, and y increases as x decreases is already known (theoretically or empirically).

$$
\begin{aligned}
&\text{Math. 1}\\
&\text{Function(x, y) \{}\\
&\quad \text{If } y > \text{alarm upper limit value of } y \text{ then } x = x + 1\\
&\quad \text{Else If } y < \text{alarm lower limit value of } y \text{ then } x = x - 1\\
&\quad \text{Else } x = x\\
&\quad \text{Return } x\\
&\text{\}}
\end{aligned}
$$

In this case, the correction unit 140 may correct the operation model output x according to the conditional expression. That is, when the monitoring model output y exceeds the alarm upper limit value, the correction unit 140 may increase the operation model output x by one. For example, when the operation model output x is "−3", the correction unit 140 may correct the operation model output x from "−3" to "−2", that is, perform a change from the action of closing the valve by 3% to the action of closing the valve by 2%. Similarly, when the monitoring model output y falls below the alarm lower limit, the correction unit 140 may decrease the operation model output x by one. For example, when the operation model output x is "−3", the correction unit 140 may correct the operation model output x from "−3" to "−4", that is, perform a change from the action of closing the valve by 3% to the action of closing the valve by 4%. In this way, the correction unit 140 may correct, when the index is out of the range, the operation model output x for the index to be in a direction toward an inside of the range. The correction unit 140 supplies the corrected operation model output x to the control unit 150.

In step S810, the control apparatus 100 outputs the manipulated variable. For example, the control unit 150 may output the manipulated variable for controlling the control target 15 provided in the facility 10, according to the operation model output x corrected in step S808. As an example, the control unit 150 may provide the control target 15 that is the operation terminal, with a new manipulated variable MV obtained by adding the corrected operation model output x to the immediately preceding manipulated variable MV at the operation terminal.

In a case where the learning is performed while a real machine is operated in generating the operation model by the machine learning, there is a possibility that a dangerous operation is performed during a learning period. In addition, in a case where the reinforcement learning is used in generating the operation model, when only the historical data is used, the learning is not converged well. Therefore, learning the operation model based on the simulation is taken into consideration. However, a situation in which the behavior of the simulator 20 designed based on the design information of the facility 10 is different from the actual operation of the facility 10, may occur. In this case, a situation in which the output of the operation model trained by the learning based on the simulation is not suitable for the actual operation of the facility 10, occurs. When such a situation occurs, in comparison to a case where the worker manually operates the facility 10, the problems such as a decrease in operating efficiency of the facility 10, a deterioration in product quality, and an increase in risk of a dangerous state, occur.

In contrast to this, in using the operation model trained by the learning based on the simulation to control the control target 15, the control apparatus 100 according to the present embodiment acquires the index for monitoring the difference between the behavior of the simulator 20 and the actual operation in the facility 10, to correct the output of the operation model, based on the index. In this manner, with the control apparatus 100 according to the present embodiment, even when the behavior of the simulator 20 is different from the actual operation of the facility 10, controlling the control target 15 by adopting the output of the operation model trained by the learning based on the simulation, as is, can be avoided.

In addition, the control apparatus 100 according to the present embodiment may use, as the index, the output of the monitoring model trained by the machine learning. In this manner, with the control apparatus 100 according to the present embodiment, it is possible to use two machine learning models and control the control target 15, while considering the gap between the simulation and the reality.

In addition, the control apparatus 100 according to the present embodiment may use, as the monitoring model, the machine learning model trained by the supervised learning. In this manner, with the control apparatus 100 according to the present embodiment, it is possible to reflect knowledge of the worker and an operational performance in the past, in the output of the monitoring model.

In addition, the control apparatus 100 according to the present embodiment may use the machine learning model trained by the reinforcement learning model as the operation model. In this manner, with the control apparatus 100 according to the present embodiment, even when it is difficult to determine an evaluation scale for one action, or when an adaptation to an unknown environment is required, it is possible to flexibly control the control target 15.

In addition, the control apparatus 100 according to the present embodiment can set, as the index, the future prediction value of the sensor, the product quality, or the like. In this way, with the control apparatus 100 according to the present embodiment, it is possible to monitor the behavior of the simulator 20, by the various indices which are desired to be caused to regress in relation to the operation in the facility 10.

In addition, when the index is out of the range of the set condition, the control apparatus 100 according to the present embodiment corrects the operation model output x for the index to be toward the inside of the range. In this manner, with the control apparatus 100 according to the present embodiment, it is possible to correct the output of the operation model such that the gap between the simulation and the reality is filled.

It should be noted that, in the above description, the case where the control apparatus 100 and the operation model management apparatus 200 are apparatuses different from each other, is shown as an example; however, the present invention is not limited to this. A part or all of the functional units of the operation model management apparatus 200 may be configured integrally with the control apparatus 100. That is, the control apparatus 100 may further include the operation model storage unit 240. In addition, the control apparatus 100 may further include the operation model learning unit 230. In addition, the control apparatus 100 may further include the target setting unit 220. In addition, the control apparatus 100 may further include the operation terminal observation point setting unit 210.

In this manner, the control apparatus 100 can realize, by a single apparatus, the function of controlling the control target 15 and the function of storing the operation model, and thus in acquiring the operation model output, it is possible to safely and securely control the control target 15 without being required to exchange the data between the apparatuses. In addition, the control apparatus 100 can realize, by a single apparatus, the function of controlling the control target 15 and the function of generating the operation model, and thus it is possible to reduce a communication cost without being required to move the generated operation model between the apparatuses.

Similarly, in the above description, the case where the control apparatus 100 and the index calculation apparatus 300 are apparatuses different from each other, is shown as an example; however, the present invention is not limited to this. A part or all of the functional units of the index calculation apparatus 300 may be configured integrally with the control apparatus 100. That is, the control apparatus 100 may further include the monitoring model storage unit 330. In addition, the control apparatus 100 may further include the monitoring model learning unit 320. In addition, the control apparatus 100 may further include the learning setting unit 310.

In this manner, the control apparatus 100 can realize, by a single apparatus, the function of controlling the control target 15 and the function of storing the monitoring model, and thus in acquiring the index, it is possible to safely and securely control the control target 15 without being required to exchange the data between the apparatuses. In addition, the control apparatus 100 can realize, by a single apparatus, the function of controlling the control target 15 and the function of generating the monitoring model, and thus it is possible to reduce a communication cost without being required to move the generated monitoring model between the apparatuses.

Figure 9:
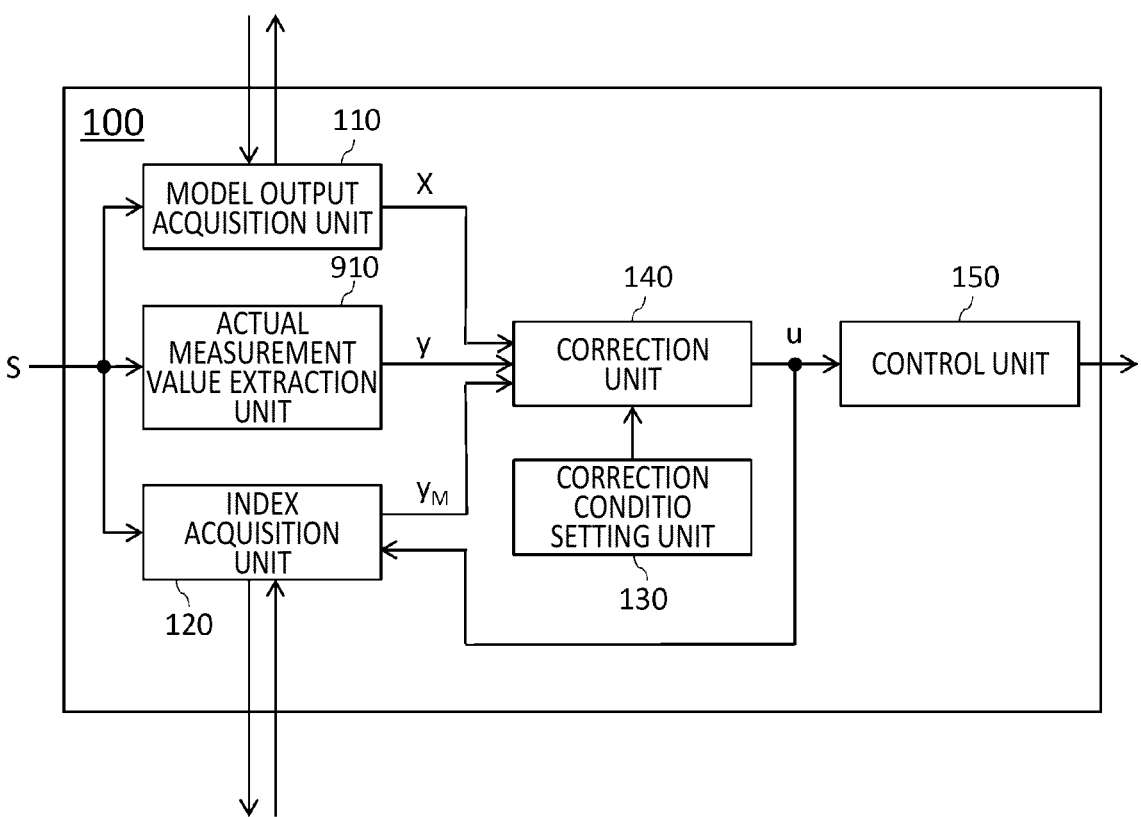
FIG. 9 shows an example of a block diagram of the control apparatus 100 according to a modification example of the present embodiment.

FIG. 9 shows an example of a block diagram of the control apparatus 100 according to a modification example of the present embodiment. In FIG. 9, the same signs and numerals are given to members having the same functions and configurations as those in FIG. 1, and the descriptions will be omitted except for the following differences. The embodiment described above has shown, as an example, the case where the control apparatus 100 acquires the monitoring model output as the index, and corrects the operation model output based on the monitoring model output. However, in the present modification example, the control apparatus 100 acquires a calculation value $y_M$ calculated by the simulator 20 as the index, and corrects the operation model output based on the calculation value $y_M$. The control apparatus 100 according to the present modification example further includes an actual measurement value extraction unit 910.

In the present modification example, the model output acquisition unit 110 functions similarly to the embodiment described above. For example, when the state data at a time t is set as S(t), the model output acquisition unit 110 may acquire an operation model output x(t) which is output according to inputting the state data S(t) to the operation model. The model output acquisition unit 110 supplies the acquired operation model output x(t) to the correction unit 140.

The actual measurement value extraction unit 910 extracts, from the state data S, an actual measurement value y which is a comparison target for the calculation value $y_M$.

For example, when an actual measurement value at the time t is set as y(t), the actual measurement value extraction unit 910 may extract a value of a target sensor which is included in the state data S(t) as the actual measurement value y(t). Here, the target sensor may be one or more sensors which are included in the state data S(t). The actual measurement value extraction unit 910 supplies the extracted actual measurement value y(t) to the correction unit 140.

In the present modification example, the index acquisition unit 120 is configured to acquire, as the index, the calculation value $y_M$ calculated by the simulator 20. For example, when the state data at a time t−1 immediately before time t is set as S(t−1), the corrected operation model output at the time t−1 is set as u(t−1), and the calculation value at the time t is set as $y_M(t)$, the index acquisition unit 120 may acquire the state data S(t−1) and the corrected operation model output u(t−1) to input them to the simulator 20. According to this, the simulator 20 may use the state data S(t−1) and the corrected operation model output u(t−1) to calculate the value $y_M(t)$ of the target sensor at the time t following the time t−1 by the simulation. The index acquisition unit 120 may acquire, as the index, the calculation value $y_M(t)$ calculated by the simulator 20, for example, in this way. The index acquisition unit 120 supplies the acquired calculation value $y_M(t)$ to the correction unit 140.

In the present modification example, the correction condition setting unit 130 may set a correction function that calculates the corrected operation model output u(t) by using the operation model output x(t), the actual measurement value y(t), and the calculation value $y_M(t)$. As an example, the correction condition setting unit 130 may set P as a first coefficient to set the correction function such as the following expression.

$$u(t)=x(t)+P*(y(t)-y_M(t)) \qquad \text{Math. 2}$$

Instead of this, the correction condition setting unit 130 may set I as a second coefficient to set the correction function such as the following expression.

$$u(t) = x(t) + P*(y(t) - y_M(t)) + I*\sum_{i=0}(y(i) - y_M(i)) \qquad \text{Math. 3}$$

Instead of this, the correction condition setting unit 130 may set D as a third coefficient to set the correction function such as the following expression.

$$u(t) = x(t) + P*(y(t) - y_M(t)) + I*\sum_{i=0}^{t}(y(i) - y_M(i)) + \qquad \text{Math. 4}$$
$$D*((y(t) - y_M(t)) - (y(t-1) - y_M(t-1)))$$

In the present modification example, the correction unit 140 uses the correction function set in the correction condition setting unit 130 to correct the operation model output. For example, the correction unit 140 may use the expression of (Math. 2) to correct the operation model output. That is, the correction unit 140 may calculate the corrected operation model output u(t) by adding, to the operation model output x(t), a value obtained by multiplying, by the coefficient, a difference between the actual measurement value y(t) and the calculation value $y_M(t)$.

Instead of this, the correction unit 140 may use the expression of (Math. 3) to correct the operation model output. That is, the correction unit 140 may calculate the corrected operation model output u(t) by adding: to the operation model output x(t), the value obtained by multiplying, by the coefficient, the difference between the actual measurement value y(t) and the calculation value $y_M(t)$; and a value obtained by multiplying, by the coefficient, an integral of the difference between the actual measurement value y(t) and the calculation value $y_M(t)$.

Instead of this, the correction unit 140 may use the expression of (Math. 4) to correct the operation model output. That is, the correction unit 140 may calculate the corrected operation model output u(t) by adding: to the operation model output x(t), the value obtained by multiplying, by the coefficient, the difference between the actual measurement value y(t) and the calculation value $y_M(t)$; the value obtained by multiplying, by the coefficient, the integral of the difference between the actual measurement value y(t) and the calculation value $y_M(t)$; and a value obtained by multiplying, by the coefficient, a deviation between the actual measurement value y(t) and the calculation value $y_M(t)$.

In the present modification example, the correction unit 140 can correct the operation model output by using the correction function that includes, in a correction term, a difference between the actual measurement value which is indicated by the state data, and the calculation value, for example, in this way. In this way, the control apparatus 100 according to the present modification example uses the calculation value calculated by the simulator 20, as the index for monitoring the difference between the behavior of the simulator 20 and the actual operation in the facility 10. In this manner, with the control apparatus 100 according to the present modification example, it is possible to simplify the processing without being required to separately prepare the model for calculating the index of the monitoring model or the like. In addition, the control apparatus 100 according to the present modification example is configured to correct the operation model output, by using the correction function that includes, in the correction term, the difference between the actual measurement value which is indicated by the state data, and the calculation value. In this manner, with the control apparatus 100 according to the present modification example, when there is the difference between the actual measurement value and the calculation value, it is possible to correct the operation model output according to a magnitude of the difference.

So far, some embodiments that are possible have been described as examples. However, the embodiment described above may be modified or applied in various modes. For example, in the above description, the case where the monitoring model that is used during the operation is trained by the learning in advance by using the historical data at the time of learning, is shown as an example. However, it is conceivable that the real data during the operation of the monitoring model, and the historical data used at the time of learning of the monitoring model are not similar to each other. In this case, the monitoring model may be triggered by a low similarity between these pieces of data, to be retrained by the learning. For example, the index calculation apparatus 300 may acquire the real data from the database 30 even during the operation. Then, the index calculation apparatus 300 calculates a degree of a similarity between the historical data used at the time of the learning, and the real data acquired during the operation, and when the similarity does not satisfy a predetermined range, the index calculation apparatus 300 may retrain the monitoring model by the learning by using the real data acquired during the operation.

In addition, in the above description, the case where the user manually sets the correction condition for correcting the operation model output, is shown as an example. However, in setting the correction condition, the machine learning model may be used. For example, the control apparatus 100 may set the correction condition by setting, as the input, the operation model output and the monitoring model output, and using the machine learning model to return the optimal corrected operation model output.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits, and may include integrated circuits (IC) and/or discrete circuits. The programmable circuit may include a reconfigurable hardware circuit including logical AND, logical OR, logical XOR, logical NAND, logical NOR, and other logical operations, a memory element such as a flip-flop, a register, a field programmable gate array (FPGA) and a programmable logic array (PLA), and the like.

A computer-readable medium may include any tangible device that can store instructions to be executed by a suitable device, and as a result, the computer-readable medium having instructions stored thereon includes an article of manufacture including instructions which can be executed to create means for performing operations specified in the flowcharts or block diagrams. Examples of the computer-readable medium may include an electronic storage medium, a magnetic storage medium, an optical storage medium, an electromagnetic storage medium, a semiconductor storage medium, and the like. More specific examples of the computer-readable medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disc (DVD), a Blu-ray (registered trademark) disc, a memory stick, an integrated circuit card, and the like.

The computer-readable instruction may include: an assembler instruction, an instruction-set-architecture (ISA) instruction; a machine instruction; a machine dependent instruction; a microcode; a firmware instruction; state-setting data; or either a source code or an object code written in any combination of one or more programming languages, including an object oriented programming language such as Smalltalk (registered trademark), JAVA (registered trademark), C++, or the like, and a conventional procedural programming language such as a "C" programming language or a similar programming language.

Computer-readable instructions may be provided to a processor of a general purpose computer, special purpose computer, or other programmable data processing apparatuses, or to a programmable circuitry, locally or via a local area network (LAN), wide area network (WAN) such as the Internet, or the like, to execute the computer-readable instructions to create means for performing operations specified in the flowcharts or block diagrams. Examples of the processor include a computer processor, a processing unit, a microprocessor, a digital signal processor, a controller, a microcontroller, and the like.

Figure 10:
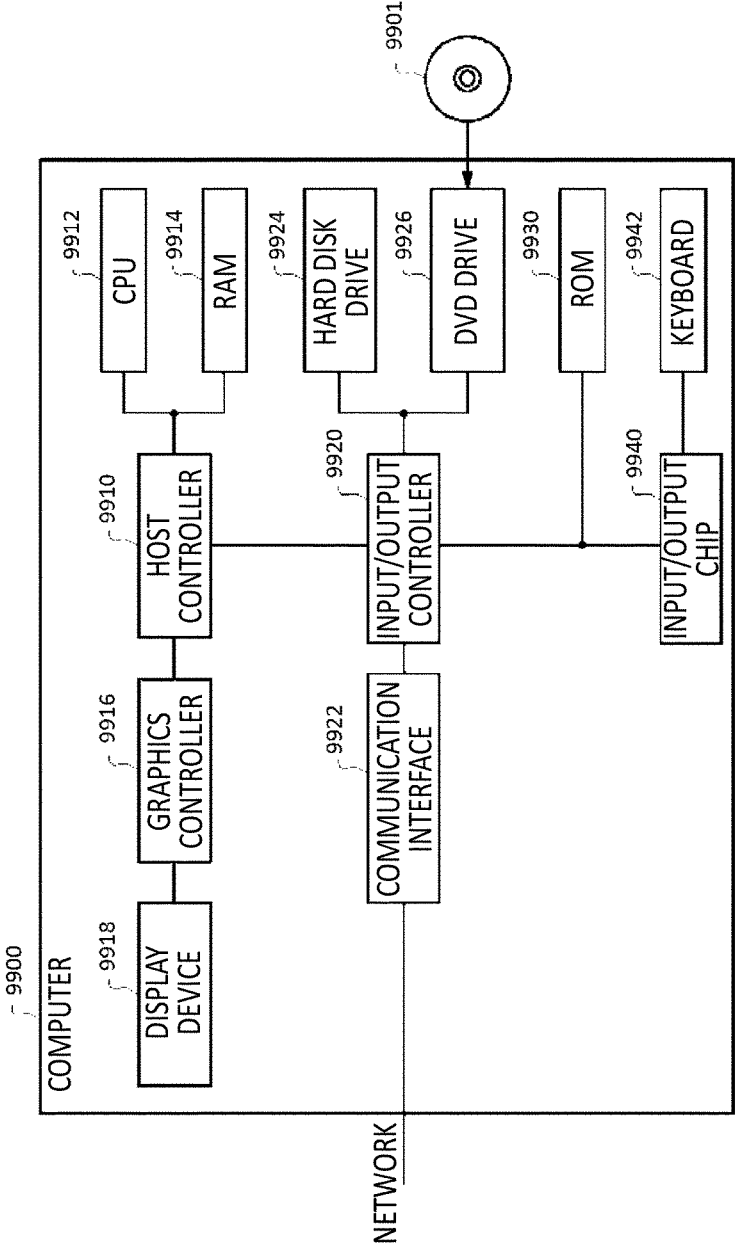
FIG. 10 shows an example of a computer 9900 in which a plurality of aspects of the present invention may be entirely or partially embodied.

FIG. 10 shows an example of a computer 9900 in which a plurality of aspects of the present invention may be entirely or partially embodied. A program that is installed in the computer 9900 can cause the computer 9900 to function as operations associated with apparatuses according to the embodiments of the present invention or one or more sections of the apparatuses, or can cause the computer 9900 to execute the operations or the one or more sections thereof, and/or can cause the computer 9900 to execute processes according to the embodiments of the present invention or steps of the processes. Such a program may be executed by a CPU 9912 so as to cause the computer 9900 to execute certain operations associated with some or all of the flowcharts and the blocks in the block diagrams described herein.

The computer 9900 according to the present embodiment includes the CPU 9912, a RAM 9914, a graphics controller 9916, and a display device 9918, which are mutually connected by a host controller 9910. The computer 9900 further includes input/output units such as a communication interface 9922, a hard disk drive 9924, a DVD drive 9926, and an IC card drive, which are connected to the host controller 9910 via an input/output controller 9920. The computer also includes legacy input/output units such as a ROM 9930 and a keyboard 9942, which are connected to the input/output controller 9920 via an input/output chip 9940.

The CPU 9912 operates according to programs stored in the ROM 9930 and the RAM 9914, thereby controlling each unit. The graphics controller 9916 acquires image data generated by the CPU 9912 on a frame buffer or the like provided in the RAM 9914 or in itself, to cause the image data to be displayed on the display device 9918.

The communication interface 9922 communicates with other electronic devices via a network. The hard disk drive 9924 stores programs and data that are used by the CPU 9912 within the computer 9900. The DVD drive 9926 reads the programs or the data from a DVD-ROM 9901, to provide the hard disk drive 9924 with the programs or the data via the RAM 9914. The IC card drive reads the programs and the data from an IC card, and/or writes the programs and the data to the IC card.

The ROM 9930 stores therein a boot program or the like executed by the computer 9900 at the time of activation, and/or a program depending on the hardware of the computer 9900. The input/output chip 9940 may also connect various input/output units to the input/output controller 9920, via a parallel port, a serial port, a keyboard port, a mouse port, or the like.

A program is provided by a computer-readable medium such as the DVD-ROM 9901 or the IC card. The program is read from the computer-readable medium, installed into the hard disk drive 9924, the RAM 9914, or the ROM 9930, which are also examples of a computer-readable medium, and executed by CPU 9912. The information processing written in these programs is read into the computer 9900, resulting in cooperation between a program and the above mentioned various types of hardware resources. An apparatus or a method may be constituted by realizing the operation or processing of information in accordance with the usage of the computer 9900.

For example, when a communication is performed between the computer 9900 and an external device, the CPU 9912 may execute a communication program loaded onto the RAM 9914 to instruct the communication interface 9922 to process the communication, based on the processing written in the communication program. The communication interface 9922, under control of the CPU 9912, reads transmission data stored on a transmission buffer region provided in a recording medium such as the RAM 9914, the hard disk drive 9924, DVD-ROM 9901, or the IC card, and transmits the read transmission data to a network or writes reception data received from a network to a reception buffer region or the like provided on the recording medium.

In addition, the CPU 9912 may cause all or a necessary portion of a file or a database to be read into the RAM 9914, the file or the database having been stored in an external recording medium such as the hard disk drive 9924, the DVD drive 9926 (the DVD-ROM 9901), the IC card, etc., and perform various types of processing on the data on the RAM 9914. The CPU 9912 then writes back the processed data to the external recording medium.

Various types of information such as various types of programs, data, tables, and databases may be stored in a recording medium and subjected to the information processing. The CPU 9912 may perform various types of processing on the data read from the RAM 9914, which includes various types of operations, information processing, condition judging, conditional branch, unconditional branch, search/replacement of information, etc., as described throughout this disclosure and designated by an instruction sequence of programs, and writes the result back to the RAM 9914. In addition, the CPU 9912 may search for information in a file, a database, etc., in the recording medium. For example, when a plurality of entries, each having an attribute value of a first attribute associated with an attribute value of a second attribute, are stored in the recording medium, the CPU 9912 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above described program or software modules may be stored in the computer-readable medium on the computer 9900 or near the computer 9900. In addition, a recording medium such as a hard disk or a RAM provided in a server system connected to a dedicated communication network or the Internet can be used as the computer-readable medium, thereby providing the program to the computer 9900 via the network.

While the embodiments of the present invention have been described, the technical scope of the present invention is not limited to the above described embodiments. It is apparent to persons skilled in the art that various alterations and improvements can be added to the above described embodiments. It is also apparent from the description of the claims that the embodiments to which such alterations or improvements are made can be included in the technical scope of the present invention.

The operations, procedures, steps, and stages of each process performed by an apparatus, system, program, and method shown in the claims, specification, or drawings can be performed in any order as long as the order is not indicated by "prior to," "before," or the like and as long as the output from a previous process is not used in a later process. Even if the process flow is described using phrases such as "first" or "next" in the claims, specification, or drawings, it does not necessarily mean that the process must be performed in this order.

EXPLANATION OF REFERENCES 1 control system; 10 facility; 15 control target; 20 simulator; 30 database; 100 control apparatus; 110 model output acquisition unit; 120 index acquisition unit; 130 correction condition setting unit; 140 correction unit; 150 control unit; 200 operation model management apparatus; 210 operation terminal observation point setting unit; 220 target setting unit; 230 operation model learning unit; 240 operation model storage unit; 300 index calculation apparatus; 310 learning setting unit; 320 monitoring model learning unit; 330 monitoring model storage unit; 910 actual measurement value extraction unit; 9900 computer; 9901 DVD-ROM; 9910 host controller; 9912 CPU; 9914 RAM; 9916 graphics controller; 9918 display device; 9920 input/output controller; 9922 communication interface; 9924 hard disk drive; 9926 DVD drive; 9930 ROM; 9940 input/output chip; 9942 keyboard.

What is claimed is:

1. A control apparatus comprising:

one or more processors provided with at least computer-executable instructions such that, when the computer-executable instructions are executed by the one or more processors, the control apparatus is configured to perform a control method comprising:

acquiring an operation model output which is output according to inputting state data indicating a state of a facility, to an operation model trained by machine learning to output an action in accordance with the state of the facility by using simulation data from a simulator that simulates an operation in the facility;

acquiring an index which is calculated by using real data from the facility and which is for monitoring a difference between a behavior of the simulator and an actual operation in the facility;

correcting the operation model output based on the index; and outputting a manipulated variable for controlling a control target provided in the facility, according to the operation model output that is corrected.

2. The control apparatus according to claim 1, wherein the control apparatus is further configured to acquire, as the index, a monitoring model output which is output according to inputting the state data, to a monitoring model trained by the machine learning to output the index in accordance with the state of the facility by using the real data.

3. The control apparatus according to claim 2, wherein the monitoring model is a machine learning model trained by supervised learning such that a difference between an output of the monitoring model and a teacher signal is reduced.

4. The control apparatus according to claim 3, wherein the control apparatus is further configured to generate the monitoring model by the supervised learning.

5. The control apparatus according to claim 1, wherein the operation model is a machine learning model trained by reinforcement learning to output an action that increases a reward value which is determined by a reward function.

6. The control apparatus according to claim 2, wherein the operation model is a machine learning model trained by reinforcement learning to output an action that increases a reward value which is determined by a reward function.

7. The control apparatus according to claim 3, wherein the operation model is a machine learning model trained by reinforcement learning to output an action that increases a reward value which is determined by a reward function.

8. The control apparatus according to claim 5, wherein the control apparatus is further configured to generate the operation model by the reinforcement learning.

9. The control apparatus according to claim 1, wherein the control apparatus is further configured to acquire, as the index, a future prediction value of a sensor which is included in the state data, or a future prediction value of a sensor which is predictable from the state data.

10. The control apparatus according to claim 2, wherein the control apparatus is further configured to acquire, as the index, a future prediction value of a sensor which is included in the state data, or a future prediction value of a sensor which is predictable from the state data.

11. The control apparatus according to claim 3, wherein the control apparatus is further configured to acquire, as the index, a future prediction value of a sensor which is included in the state data, or a future prediction value of a sensor which is predictable from the state data.

12. The control apparatus according to claim 1, wherein the control apparatus is further configured to acquire, as the index, a value obtained by quantifying a quality of a product or a semi-finished product manufactured at the facility.

13. The control apparatus according to claim 2, wherein the control apparatus is further configured to acquire, as the index, a value obtained by quantifying a quality of a product or a semi-finished product manufactured at the facility.

14. The control apparatus according to claim 1, wherein the control apparatus is further configured to set a condition for correcting the operation model output.

15. The control apparatus according to claim 2, wherein the control apparatus is further configured to set a condition for correcting the operation model output.

16. The control apparatus according to claim 14, wherein the condition includes an allowable range of the index, and the control apparatus is further configured to correct, when the index is out of the range, the operation model output for the index to be in a direction toward an inside of the range.

17. The control apparatus according to claim 1, wherein the control apparatus is further configured to acquire, as the index, a calculation value calculated by the simulator.

18. The control apparatus according to claim 17, wherein the control apparatus is further configured to correct the operation model output, by using a correction function that includes, in a correction term, a difference between an actual measurement value which is indicated by the state data, and the calculation value.

19. A control method that is executed by a computer system comprising one or more computers, the control method comprising: by the computer system, acquiring an operation model output which is output according to inputting state data indicating a state of a facility, to an operation model trained by machine learning to output an action in accordance with the state of the facility by using simulation data from a simulator that simulates an operation in the facility;

acquiring an index which is calculated by using real data from the facility and which is for monitoring a difference between a behavior of the simulator and an actual operation in the facility;

correcting the operation model output based on the index; and outputting a manipulated variable for controlling a control target provided in the facility, according to the operation model output that is corrected.

20. A non-transitory computer readable medium having a control program recorded thereon, when executed by a computer system comprising one or more computers, the control program causing the computer system to perform a control method comprising:

acquiring an operation model output which is output according to inputting state data indicating a state of a facility, to an operation model trained by machine learning to output an action in accordance with the state of the facility by using simulation data from a simulator that simulates an operation in the facility;

acquiring an index which is calculated by using real data from the facility and which is for monitoring a difference between a behavior of the simulator and an actual operation in the facility;

correcting the operation model output based on the index; and outputting a manipulated variable for controlling a control target provided in the facility, according to the operation model output that is corrected.

* * * * *